United States Patent
Luo et al.

(10) Patent No.: US 12,528,516 B2
(45) Date of Patent: Jan. 20, 2026

(54) STRUCTURED MULTI-AGENT INTERACTIVE TRAJECTORY FORECASTING

(71) Applicant: Waymo LLC, Mountain View, CA (US)

(72) Inventors: Wenjie Luo, Santa Clara, CA (US); Cheolho Park, Palo Alto, CA (US); Dragomir Anguelov, San Francisco, CA (US); Benjamin Sapp, Marina del Rey, CA (US)

(73) Assignee: Waymo LLC, Mountain View, CA (US)

( * ) Notice: Subject to any disclaimer, the term of this patent is extended or adjusted under 35 U.S.C. 154(b) by 228 days.

(21) Appl. No.: 18/335,920

(22) Filed: Jun. 15, 2023

(65) Prior Publication Data

US 2023/0406361 A1 Dec. 21, 2023

Related U.S. Application Data

(60) Provisional application No. 63/352,618, filed on Jun. 15, 2022.

(51) Int. Cl.
*B60W 60/00* (2020.01)
*B60W 50/00* (2006.01)

(52) U.S. Cl.
CPC .. *B60W 60/00272* (2020.02); *B60W 50/0097* (2013.01); *B60W 2554/4026* (2020.02);
(Continued)

(58) Field of Classification Search
CPC ....... B60W 60/00272; B60W 50/0097; B60W 2554/4026; B60W 2554/4029; B60W 2554/4046
See application file for complete search history.

(56) References Cited

U.S. PATENT DOCUMENTS

| | | | | |
|---|---|---|---|---|
| 11,498,587 | B1* | 11/2022 | Mitlin | G05D 1/0214 |
| 11,975,726 | B1* | 5/2024 | Gu | G06N 3/044 |

(Continued)

OTHER PUBLICATIONS

Alahi et al., "Social LSTM: Human trajectory prediction in crowded spaces," Proceedings of the IEEE Conference on Computer Vision and Pattern Recognition (CVPR), Jun. 27-30, 2016, pp. 961-971.
(Continued)

*Primary Examiner* — Peter D Nolan
*Assistant Examiner* — Mikko Okechukwu Obioha
(74) *Attorney, Agent, or Firm* — Fish & Richardson P.C.

(57) ABSTRACT

Methods, systems, and apparatus for generating trajectory predictions for one or more agents. In one aspect, a system comprises one or more computers configured to obtain scene context data characterizing a scene in an environment at a current time point, where the scene includes multiple agents. The one or more computers process the scene context data using a marginal trajectory prediction neural network to generate a respective marginal trajectory prediction for each of the plurality of agents that defines multiple possible trajectories for the agent after the current time point and a respective likelihood score for each of the multiple possible future trajectories. The one or more computers can generate graph data based on the respective marginal trajectory predictions, and the one or more computers can process the graph data using a graph neural network to generate a joint trajectory prediction output for the multiple agents in the scene.

20 Claims, 5 Drawing Sheets

(52) U.S. Cl.
CPC ............... *B60W 2554/4029* (2020.02); *B60W 2554/4046* (2020.02)

(56) References Cited

U.S. PATENT DOCUMENTS

| | | | |
|---|---|---|---|
| 12,204,823 B1* | 1/2025 | Capell | G06N 20/00 |
| 12,208,819 B1* | 1/2025 | Funke | B60W 30/0956 |
| 2022/0355825 A1* | 11/2022 | Deo | B60W 50/0097 |

OTHER PUBLICATIONS

Bansal et al., "ChauffeurNet: Learning to drive by imitating the best and synthesizing the worst," CoRR, Dec. 7, 2018, arXiv: 1812.03079v1, 20 pages.

Bhat et al., "Trajformer: Trajectory prediction with local self-attentive contexts for autonomous driving," CoRR, submitted on Nov. 30, 2020, arXiv:2011.14910v1, 6 pages.

Caesar et al., "nuScenes: A multimodal dataset for autonomous driving," CoRR, Mar. 26, 2019, arXiv:1903.11027v1, 10 pages.

Casas et al., "IntentNet: Learning to predict intention from raw sensor data," Proceedings of the 2nd Conference on Robot Learning (PMLR), Oct. 23, 2018, 87:947-956.

Casas et al., "Spagnn: Spatially-aware graph neural networks for relational behavior forecasting from sensor data," CoRR, submitted on Oct. 18, 2019, arXiv:1910.08233v1, 11 pages.

Chang et al., "Argoverse: 3d tracking and forecasting with rich maps," Proceedings of the IEEE/CVF Conference on Computer Vision and Pattern Recognition (CVPR), Jun. 16-20, 2019, pp. 8748-8757.

Cui et al., "Multimodal trajectory predictions for autonomous driving using deep convolutional networks," 2019 International Conference on Robotics and Automation (ICRA), May 20-24, 2019, pp. 2090-2096.

Ettinger et al., "Large scale interactive motion forecasting for autonomous driving: The waymo open motion dataset," CoRR, submitted on Apr. 20, 2021, arXiv:2104.10133v1, 15 pages.

Gao et al., "VectorNet: Encoding HD Maps and Agent Dynamics from Vectorized Representation," Proceedings of the IEEE/CVF Conference on Computer Vision and Pattern Recognition, Jun. 13-19, 2020, pp. 11525-1153.

Gilles et al., "GOHOME: Graph-oriented heatmap output for future motion estimation," CoRR, submitted on Sep. 4, 2021, arXiv:2109.01827v1, 14 pages.

Girgis et al., "Autobots: Latent variable sequential set transformers," CoRR, Jun. 16, 2021, arXiv:2104.00563v2, 21 pages.

Gu et al., "DenseTNT: End-to-end Trajectory Prediction from Dense Goal Sets," Proceedings of the IEEE/CVF International Conference on Computer Vision (ICCV), Oct. 11-17, 2021, pp. 15303-15312.

Gu et al., "DenseTNT: Waymo Open Dataset Motion Prediction Challenge 1st Place Solution," CoRR, submitted on Sep. 26, 2021, 5 pages.

Ho et al., "Axial attention in multidimensional transformers," CoRR, submitted on Dec. 20, 2019, arXiv: 1912.12180v1, 11 pages.

Khandelwal et al., "What-if motion prediction for autonomous driving," CoRR, submitted on Aug. 24, 2020, arXiv:2008.10587v1, 16 pages.

Lee et al., "DESIRE: Distant future prediction in dynamic scenes with interacting agents," Proceedings of the IEEE Conference on Computer Vision and Pattern Recognition (CVPR), Jul. 21-26, 2017, pp. 336-345.

Li et al., "RAIN: Reinforced hybrid attention inference network for motion forecasting," Proceedings of the IEEE/CVF International Conference on Computer Vision (ICCV), Oct. 11-17, 2021, pp. 16096-16106.

Liang et al., "Learning lane graph representations for motion forecasting," Proceeding of the Computer Vision—ECCV 2020: 16th European Conference, Aug. 23-28, 2020, Aug. 2020, pp. 541-556.

Liang et al., "The garden of forking paths: Towards multi-future trajectory prediction," Proceedings of the IEEE/CVF Conference on Computer Vision and Pattern Recognition, Jun. 13-19, 2020, pp. 10508-10518.

Liu et al., "Multimodal motion prediction with stacked transformers," Proceedings of the IEEE/CVF Conference on Computer Vision and Pattern Recognition (CVPR), Jun. 19-25, 2021, pp. 7577-7586.

Luo et al., "Fast and furious: Real time end-to-end 3d detection, tracking and motion forecasting with a single convolutional net," Proceedings of the IEEE Conference on Computer Vision and Pattern Recognition (CVPR), Jun. 18-22, 2018, pp. 3569-3577.

Marchetti et al., "MANTRA: Memory augmented networks for multiple trajectory prediction," Proceedings of the IEEE/CVF Conference on Computer Vision and Pattern Recognition (CVPR), Jun. 13-19, 2020, pp. 7143-7152.

Mercat et al., "Multi-head attention for multi-modal joint vehicle motion forecasting," 2020 IEEE International Conference on Robotics and Automation (ICRA), May 31, 2020, pp. 9638-9644.

Mo et al., "Heterogeneous Edge-Enhanced Graph Attention Network for Multi-Agent Trajectory Prediction," CoRR, submitted on Jun. 14, 2021, arXiv:2106.07161v1, 12 pages.

Ngiam et al., "Scene transformer: A unified multi-task model for behavior prediction and planning," CoRR, submitted on Jun. 15, 2021, arXiv:2106.08417v1, 21 pages.

Phan-Minh et al., "CoverNet: Multimodal behavior prediction using trajectory sets," CoRR, submitted on Nov. 23, 2019, arXiv:1911.10298v1, 12 pages.

Rhinehart et al. "PRECOG: PREdiction Conditioned on Goals in Visual Multi-Agent Settings," Proceedings of the IEEE/CVF International Conference on Computer Vision (ICCV), Oct. 27-Nov. 2, 2019, pp. 2821-2830.

Rhinehart et al., "R2p2: A reparameterized pushforward policy for diverse, precise generative path forecasting," Proceedings of the European Conference on Computer Vision (ECCV), Sep. 8-14, 2018, pp. 794-811.

Salzmann et al., "Trajectron++: Dynamically-feasible trajectory forecasting with heterogeneous data," CoRR, submitted on Apr. 5, 2020, arXiv:2001.03093v2, 22 pages.

Sapp et al., "Multipath: Multiple probabilistic anchor trajectory hypotheses for behavior prediction," Proceedings of the Conference on Robot Learning (PMLR), Nov. 2019, 100:86-99.

Song et al., "PiP: Planning-informed trajectory prediction for autonomous driving," Computer Vision—ECCV 2020: 16th European Conference, Aug. 23-28, 2020, pp. 598-614.

Sun et al., "M2I: From factored marginal trajectory prediction to interactive prediction," CoRR, submitted on Mar. 28, 2022, arXiv:2202.11884v2, 15 pages.

Tang et al., "Multiple futures prediction," Proceedings of the 33rd International Conference on Neural Information Processing Systems, Dec. 2019, pp. 15424-15434.

Tolstaya et al., "Identifying driver interactions via conditional behavior prediction," CoRR, submitted on Jun. 1, 2021, arXiv:2104.09959v2, 7 pages.

Van Den Oord et al., "Neural discrete representation learning," Proceedings of the 31st International Conference on Neural Information Processing Systems, Dec. 2017, pp. 6309-6318.

Varadarajan et al., "Multipath++: Efficient information fusion and trajectory aggregation for behavior prediction," CoRR, submitted on Dec. 22, 2021, arXiv:2111.14973v3, 22 pages.

Yuan et al., "Diverse trajectory forecasting with determinantal point processes," Proceeding of International Conference on Learning Representations, Apr. 2020, 15 pages.

Zeng et al., "DSDNet: Deep Structured Self-Driving Network," Proceeding of Computer Vision—ECCV 2020: 16th European Conference, Aug. 23-28, 2020, pp. 156-172.

Zeng et al., "End-to-end interpretable neural motion planner," Proceedings of the IEEE/CVF Conference on Computer Vision and Pattern Recognition (CVPR), Jun. 16-20, 2019, pp. 8660-8669.

Zeng et al., "LaneRCNN: Distributed representations for graphcentric motion forecasting," CoRR, submitted on Jan. 17, 2021, arXiv:2101.06653v1, 14 pages.

(56) References Cited

OTHER PUBLICATIONS

Zhan et al., "Interaction Dataset: An INTERnational, Adversarial and Cooperative moTION Dataset in Interactive Driving Scenarios with Semantic Maps," CoRR, Sep. 30, 2019, arXiv:1910.03088v1, 13 pages.
Zhao et al., "TNT: Target-driveN trajectory prediction," CoRR, submitted on Aug. 19, 2020, arXiv:2008.08294v1, 12 pages.

* cited by examiner

STRUCTURED MULTI-AGENT INTERACTIVE TRAJECTORY FORECASTING

CROSS-REFERENCE TO RELATED APPLICATION

This application claims priority to U.S. Provisional Application No. 63/352,618, filed on Jun. 15, 2022. The disclosure of the prior application is considered part of and is incorporated by reference in the disclosure of this application.

BACKGROUND

This specification relates to predicting the future trajectory of an agent in an environment.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

BRIEF DESCRIPTION OF THE DRAWINGS

Like reference numbers and designations in the various drawings indicate like elements.

DETAILED DESCRIPTION

Figure 1:
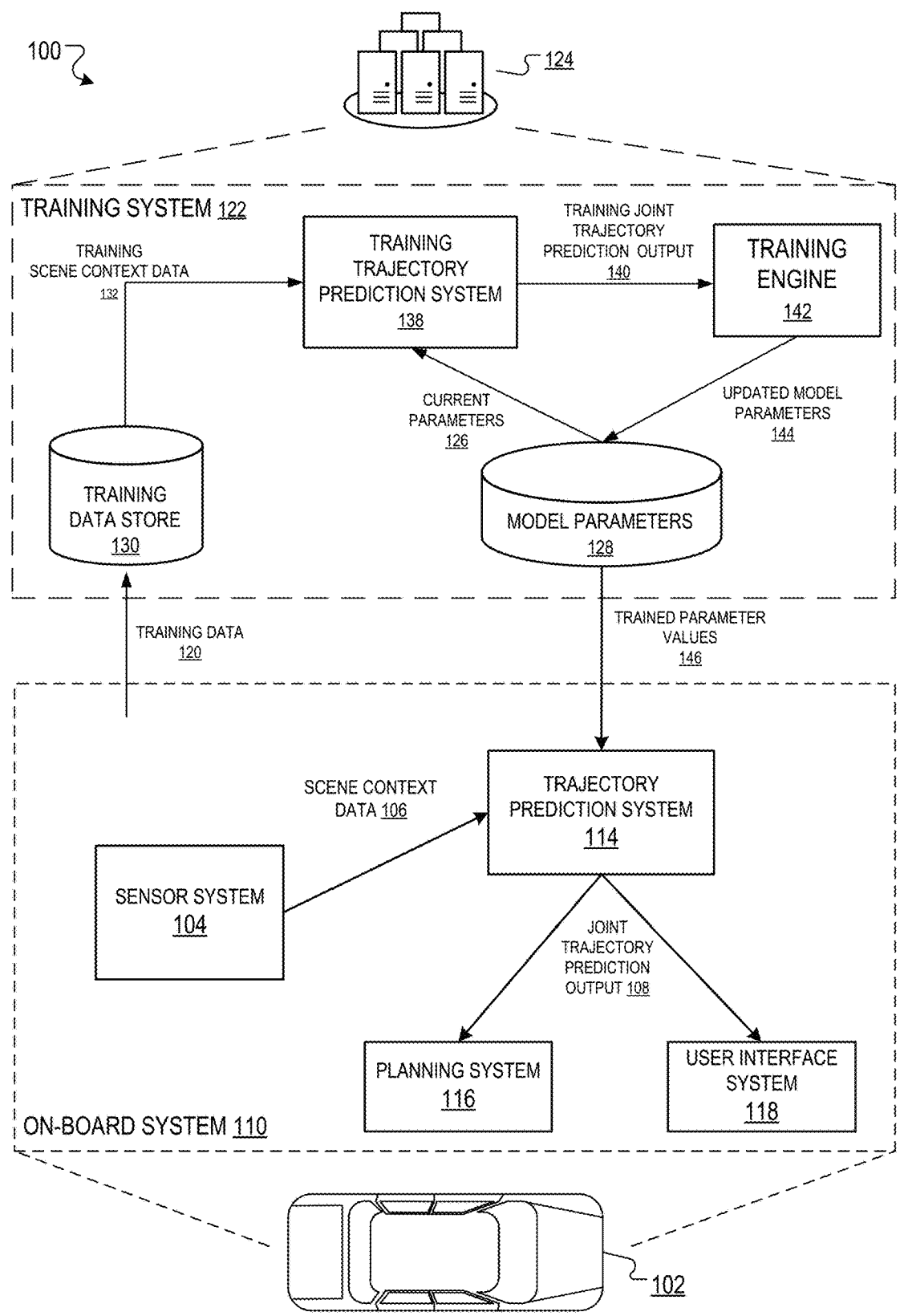
FIG. 1 is a block diagram of an example system.

This specification describes a system implemented as computer programs on one or more computers in one or more locations that generates a joint trajectory prediction for a plurality of agents, e.g., a vehicle, a cyclist, or a pedestrian, in an environment. The trajectory prediction is referred to as a "joint" trajectory prediction because the system makes the prediction for each agent in a manner that considers possible future trajectories for other agents. In other words, the joint trajectory prediction for a given target agent is a prediction characterizing future trajectories of the target agent starting from a current time point conditioned on likely future motion of other agents in the scene and possible future interactions between agents in the scene.

For example, the joint trajectory prediction may be made by an on-board computer system of an autonomous vehicle navigating through the environment, the query agent may be the autonomous vehicle, and the target agent may be an agent that has been detected by the sensors of the autonomous vehicle. The joint behavior prediction can then be used by the on-board system to control the autonomous vehicle, i.e., to plan the future motion of the vehicle based in part on the likely consequences of one or more planned future trajectories on the motion of other agents in the environment.

As another example, the joint trajectory prediction may be made in a computer simulation of a real-world environment being navigated through by a simulated autonomous vehicle and the target agent, so that the query agent is the simulated autonomous vehicle, and the target agent is another simulated vehicle in the vicinity of the simulated autonomous vehicle in the computer simulation. Generating these predictions in simulation may assist in controlling the simulated vehicle, in testing the realism of certain situations encountered in the simulation, and in ensuring that the simulation includes surprising interactions that are likely to be encountered in the real-world. More generally, generating these predictions in simulation can be part of testing the control software of a real-world autonomous vehicle before the software is deployed on-board the autonomous vehicle, of training one or more machine learning models that will layer be deployed on-board the autonomous vehicle or both.

Conventional systems have attempted to capture interactions of multiple agents in an environment as inputs to an encoder of a trajectory prediction neural network. In particular, conventional techniques have focused on generating and encoding input representations of complex scene context data, including a road network and an agent's relationships with other agents within the road network.

However, conventional systems have not addressed accurately representing interactions of agents in the output stages of the trajectory prediction neural network, such as in inputs to the decoder of the trajectory prediction neural network. Additionally, though conventional systems have used marginal trajectory predictions, computed independently for each agent, to generate trajectory predictions of agents, the systems have not accurately modeled the underlying joint probability distribution of future agent trajectories. As a result, the trajectory predictions for each agent are not necessarily consistent with each other, and often result in unrealistic trajectory overlaps between multiple agents.

To mitigate these issues, this specification describes a system that is trained to generate accurate and consistent joint agent trajectory predictions. The described system represents trajectory predictions for multiple agents using a graphical representation in order to generate consistent trajectory predictions. In particular, the system generates the graphical representation as a dynamic interactive graph, where nodes correspond to agents, and edges correspond to interactions between agents. The system then uses the dynamic interactive graph to convert marginal trajectory predictions for individual agents into a joint trajectory prediction for multiple agents. Thus, the described system can generate more accurate trajectory predictions by leveraging graph data based on interactions between the multiple agents.

FIG. 1 shows an example system 100. The system 100 includes an on-board system 110 and a training system 122.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes a sensor system 104 which enables the on-board system 110 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data, which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In some examples, the on-board system 110 can process the raw sensor data to generate the scene context data 106.

The scene context data 106 includes agent data for multiple agents in a scene of an environment at a corresponding time point, e.g., respective agent data characterizing states of each agent at the corresponding time point and one or more preceding time points.

The scene context data 106 characterizes a scene in an environment, e.g., an area of the environment that includes the area within a threshold distance of the autonomous vehicle or the area that is within range of at least one sensor of the vehicle.

In some cases, the scene context data 106 includes past trajectories of each of the multiple agents, static road elements (e.g., a road graph), and dynamic road elements (e.g., traffic lights).

At any given time point, the on-board system 110 can process the scene context data 106 using a trajectory prediction system 114 to predict the trajectories of agents (e.g., pedestrians, bicyclists, other vehicles, and the like) in the environment in the vicinity of the vehicle 102.

The future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point. The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The sensor system 104 can send the scene context data 106 to a trajectory prediction system 114, also on-board the vehicle 102. In some examples, the system can include one or more neural networks, such as a marginal trajectory prediction neural network and a graph neural network, and a graph generation system, as described in further detail with reference to FIG. 4.

The trajectory prediction system 114 can have one or more neural networks with any appropriate architecture that allows the trajectory prediction system 114 to map scene context data 106 for multiple modalities to a joint trajectory prediction output 108 for one or more agents, e.g., an architecture of a Scene Transformer model, a DenseTNT model, a Multipath++ model, etc.

The trajectory prediction system 114 can process the scene context data 106 to generate a respective marginal trajectory prediction for each of the multiple agents using one or more neural networks. For example, the trajectory prediction system 114 can generate the marginal trajectory predictions using a marginal trajectory prediction neural network.

As used in this specification, a trajectory for an agent is a sequence that includes a respective agent state for the agent for each of multiple future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point.

Additionally, the trajectory prediction system can generate graph data representing a graph of the scene using a graph generation system, and the trajectory prediction system 114 can process the graph data using a graph neural network to generate the joint trajectory prediction output 108 for the multiple agents in the scene.

The joint trajectory prediction output 108 identifies a most likely future trajectory for each agent given the marginal trajectory predictions for the multiple agents, as described in further detail below with reference to FIG. 3.

The on-board system 110 can provide the joint trajectory prediction output 108 generated by the trajectory prediction system 114 to a planning system 116, a user interface system 118, or both.

When the planning system 116 receives the joint trajectory prediction output 108, the planning system 116 can use the joint trajectory prediction output 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the predicted future trajectory of the agent. In a particular example, the on-board system 110 may provide the planning system 116 with the joint trajectory prediction output 108 indicating that another vehicle which is attempting to merge onto a roadway being travelled by the vehicle 102 is unlikely to yield to the vehicle 102. In this example, the planning system 116 can generate fully-autonomous control outputs to apply the brakes of the vehicle 102 to avoid a collision with the merging vehicle. The fully-autonomous or partly-autonomous driving decisions generated by the planning system 116 can be implemented by a control system of the vehicle 102. For example, in response to receiving a fully-autonomous driving decision generated by the planning system 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface system 118 receives the joint trajectory prediction output 108, the user interface system 118 can use the joint trajectory prediction output 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 110 may provide the user interface system 118 with the joint trajectory prediction output 108 indicating that another vehicle which is attempting to merge onto a roadway being travelled by the vehicle 102 is unlikely to yield to the vehicle 102. In this example, the user interface system 118 can present an alert message to the driver of the vehicle 102 with instructions to adjust the trajectory of the vehicle 102 to avoid a collision with the merging vehicle.

The on-board system 110 can generate training data 120 used by a training system 122 to determine trained parameter values of the trajectory prediction system 114 from the joint trajectory prediction output 108 which is continually generated by the on-board system 110. The on-board system 110 can provide the training data 120 to the training system 122 in offline batches or in an online fashion, for example, continually whenever it is generated.

The training system 122 is typically hosted within a data center 124, which can be a distributed computing system having hundreds or thousands of computers in one or more locations.

The training system 122 can store the training data 120 in a training data store 130.

The training system 122 includes at least one training trajectory prediction system 138 that is configured to generate a training joint trajectory prediction output 140 from training scene context data 132.

The training system 122 includes multiple computing devices having software or hardware modules that implement the respective operations of each layer of one or more of the neural networks of the training trajectory prediction system 138 according to an architecture of the training trajectory prediction system 138. The one or more neural networks of the training trajectory prediction system 138 generally have (at least partially) the same architecture as the on-board trajectory prediction system 114.

The training trajectory prediction system 138 is configured to obtain training scene context data 132 132 from the training data store 130. The training scene context data 132 can be a subset of the training data 120. The training scene context data 132 in the training data store 130 may be obtained from real or simulated driving data logs.

The training trajectory prediction system 138 processes the training scene context data 132 to generate a training joint trajectory prediction output 140 that includes most likely future trajectory for each agent given the marginal trajectory predictions for the multiple agents, as described in further detail below with reference to FIG. 3.

The training trajectory prediction system 138 is configured to obtain ground truth trajectories. A training engine 142 is configured to analyze the training joint trajectory prediction output 140 and compare the training joint trajectory prediction output 140 to the ground truth trajectories.

The training engine 142 then generates updated model parameter values 144 by using an appropriate machine learning training technique. The training engine 142 can then update the collection of model parameters 128 using the updated model parameter values 144.

The training engine 142 trains the training trajectory prediction system 138 on the training scene context data 132 to minimize a cross-entropy and regression loss, as described in more detail below with reference to FIG. 5.

Once the parameter values of the multiple neural networks have been fully trained, the training system 122 can send the trained parameter values 146 to the trajectory prediction system 114, e.g., through a wired or wireless connection.

While this specification describes that the joint trajectory prediction output 108 is generated on-board an autonomous vehicle, more generally, the described techniques can be implemented on any system of one or more computers that receives images of scenes in an environment. That is, once the training system 122 has trained the training trajectory prediction system 138, the trained system can be used by any system of one or more computers.

As one example, the joint trajectory prediction output 108 can be generated on-board a different type of agent that has a camera sensor and that interacts with objects as it navigates through an environment. For example, the joint trajectory prediction output 108 can be generated by one or more computers embedded within a robot or other agent.

As another example, the joint trajectory prediction output 108 can be generated by one or more computers that are remote from the agent and that receive images captured by one or more camera sensors of the agent. In some of these examples, the one or more computers can use the joint trajectory prediction output 108 to generate control decisions for controlling the agent and then provide the control decisions to the agent for execution by the agent.

Figure 2:
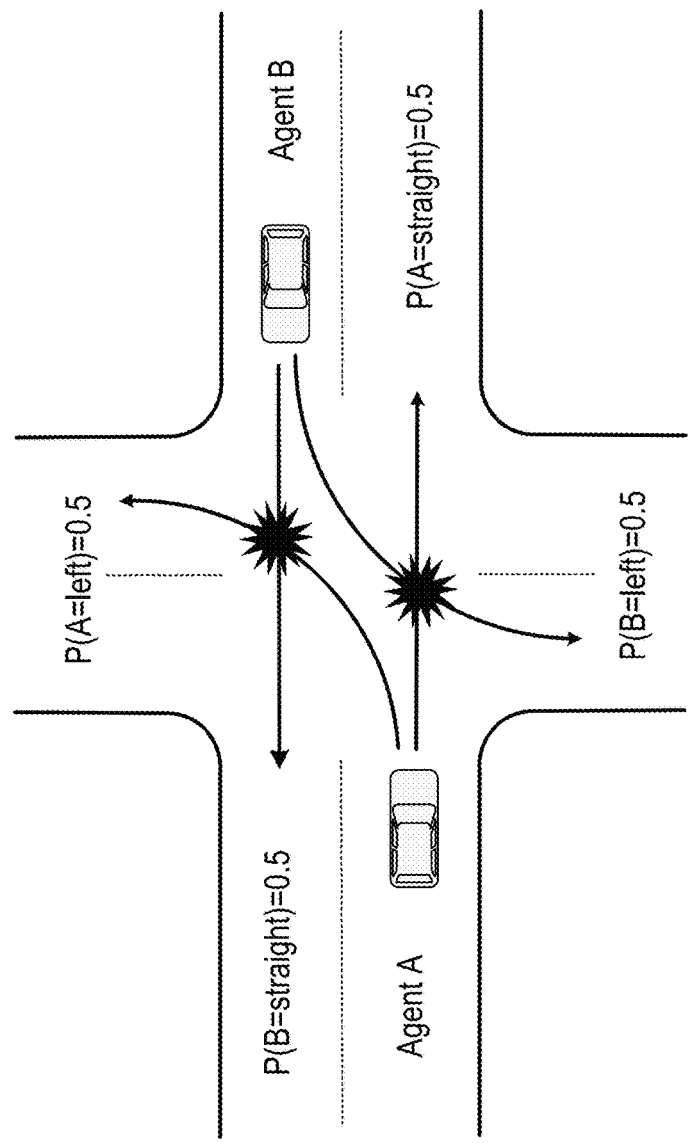
FIG. 2 is a diagram of generating trajectory predictions for agents in an environment.

FIG. 2 shows a diagram of generating trajectory predictions for agents in an environment.

The diagram 200 shows two agents, agent A and agent B, and their respective marginal probabilities for two different trajectory predictions (e.g., turning left or going straight). In the example of FIG. 2, according to the marginal probability predictions, the two agents can arrive at an intersection with equal prior probability of going straight or turning left.

In other words, in this case, the possible outcomes are represented by {Agent A, Agent B}×{going straight, turning left}. For example, the marginal probability of agent A turning left is 0.5, the marginal probability of agent A going straight is 0.5, the marginal probability of agent B turning left is 0.5, and the marginal probability of agent B going straight is 0.5.

However, there are shortcomings in solely using marginal trajectories prediction for autonomous driving. By representing the future set of trajectories with marginal probabilities, a system may not fully capture that two of four possible outcomes in {Agent A, Agent B}×{going straight, turning left} are not feasible (e.g., can result in a collision). That is, the marginal probability predictions do not reflect that, to avoid a collision, Agent A will likely not go straight if Agent B turns left, and Agent B will likely not go straight if Agent A turns left.

In some examples, K can be set to be a higher amount of future trajectories (e.g., 6) instead of 2 as in the example of FIG. 2, which can result in even less accurate future predictions for multiple agents because a system may be unable to properly process the higher amount of trajectories for a greater number of agents to identify which trajectories are inconsistent with one another or improperly overlap.

To account for this, the described system models the joint distribution of all agents of interest I in a scene as multiple joint probabilities of predicted trajectories for each agent (e.g., p(s1, s2, . . . , sI)) in order to generate more complete and accurate trajectory predictions.

Figure 3:
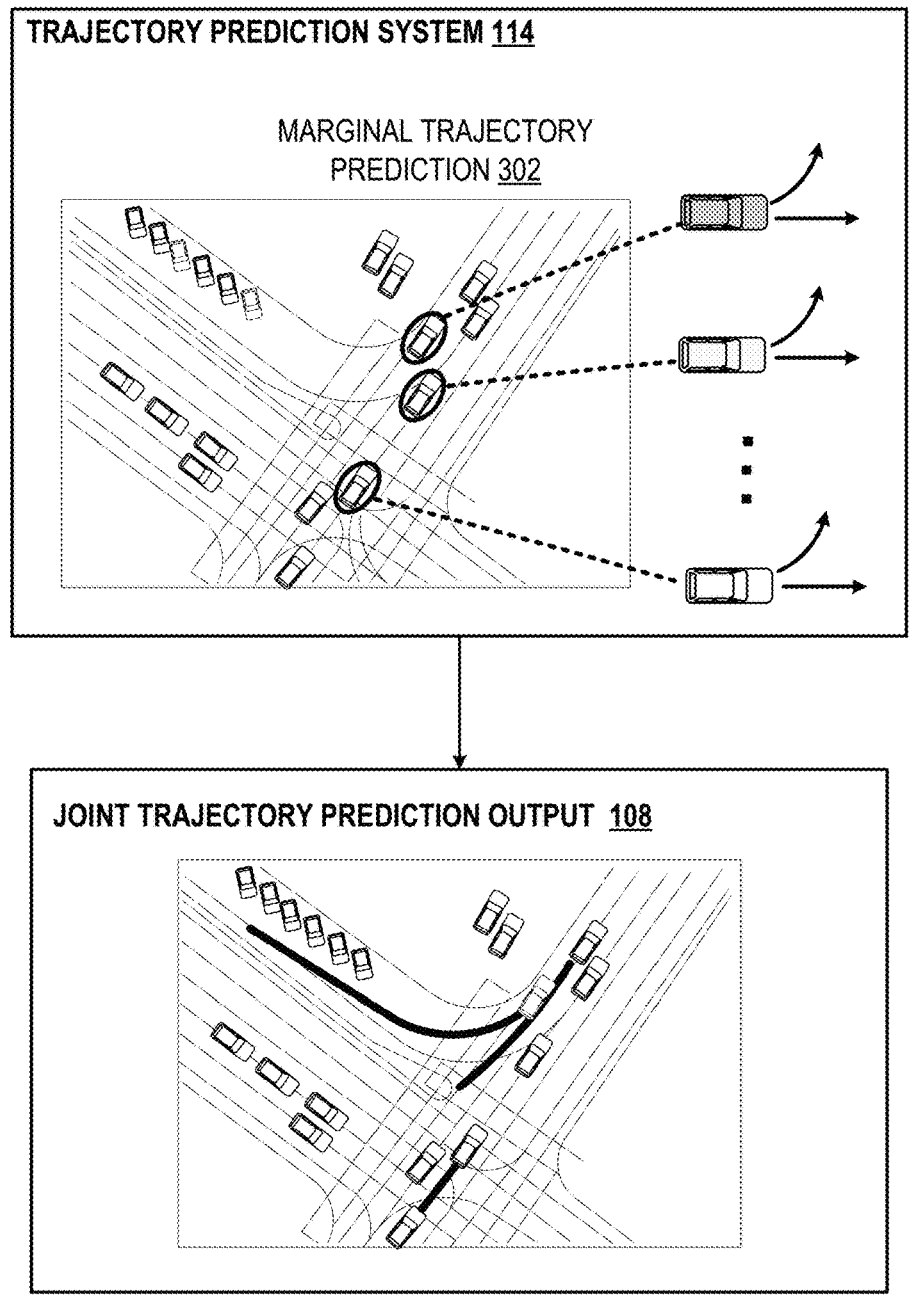
FIG. 3 is a diagram of marginal trajectories of multiple agents and a joint trajectory prediction output for the multiple agents.

FIG. 3 shows a diagram of marginal trajectories of multiple agents and a joint trajectory prediction output for the multiple agents.

The diagram 300 includes a representation of the marginal trajectory prediction 302 and of the joint trajectory prediction output 108 generated by the system 114. The joint trajectory prediction system 114 uses a marginal prediction neural network to process scene context data 106 in order to generate the marginal trajectory prediction 302.

As described above, the scene context data includes agent history data (e.g., past trajectories of the agents), road graph data, and traffic light status data. The scene context data 106 centers each agent at its last timestep's location and rotates the scene context data 106 to a consistent position for each agent.

The road graph data includes a polyline representation of the roads in the environment, where each polyline segment represents raw road graph data. For each agent, the scene context data includes polyline segments that are closest to the agent in an agent-centric coordinate frame with the 2D location, direction, length and type of the polyline segments.

The traffic light status data includes a type of traffic light, states over time of the traffic light, and 2D location of the traffic light in the road graph.

The trajectory prediction system 114 processes the scene context data 106 to generate the joint trajectory prediction output 108, as described in further detail below with reference to FIG. 4.

Generally, the trajectory prediction system 114 uses the marginal trajectory prediction neural network to generate the marginal trajectory prediction 302 for each agent of the multiple agents. The marginal trajectory prediction 302 defines multiple possible future trajectories for each agent after the current time point and a respective likelihood score for each of the possible future trajectories.

The trajectory prediction system 114 then generates the joint trajectory prediction output 108 by modeling trajectories for each agent using a graph, which is defined by both unary features and pairwise features of the interactions between agents. The unary features correspond to each agent of the multiple agents and are modeled as the nodes of the graph, and the pairwise features correspond to interactions between a pair of agents and are modeled as the edges of the graph.

The joint trajectory prediction output 108 approximates a joint probability distribution over future trajectories for the multiple agents. In some examples, the joint probability distribution is a joint probability distribution over the possible future trajectories in a set of marginal trajectory predictions for the plurality of agents.

Figure 4:
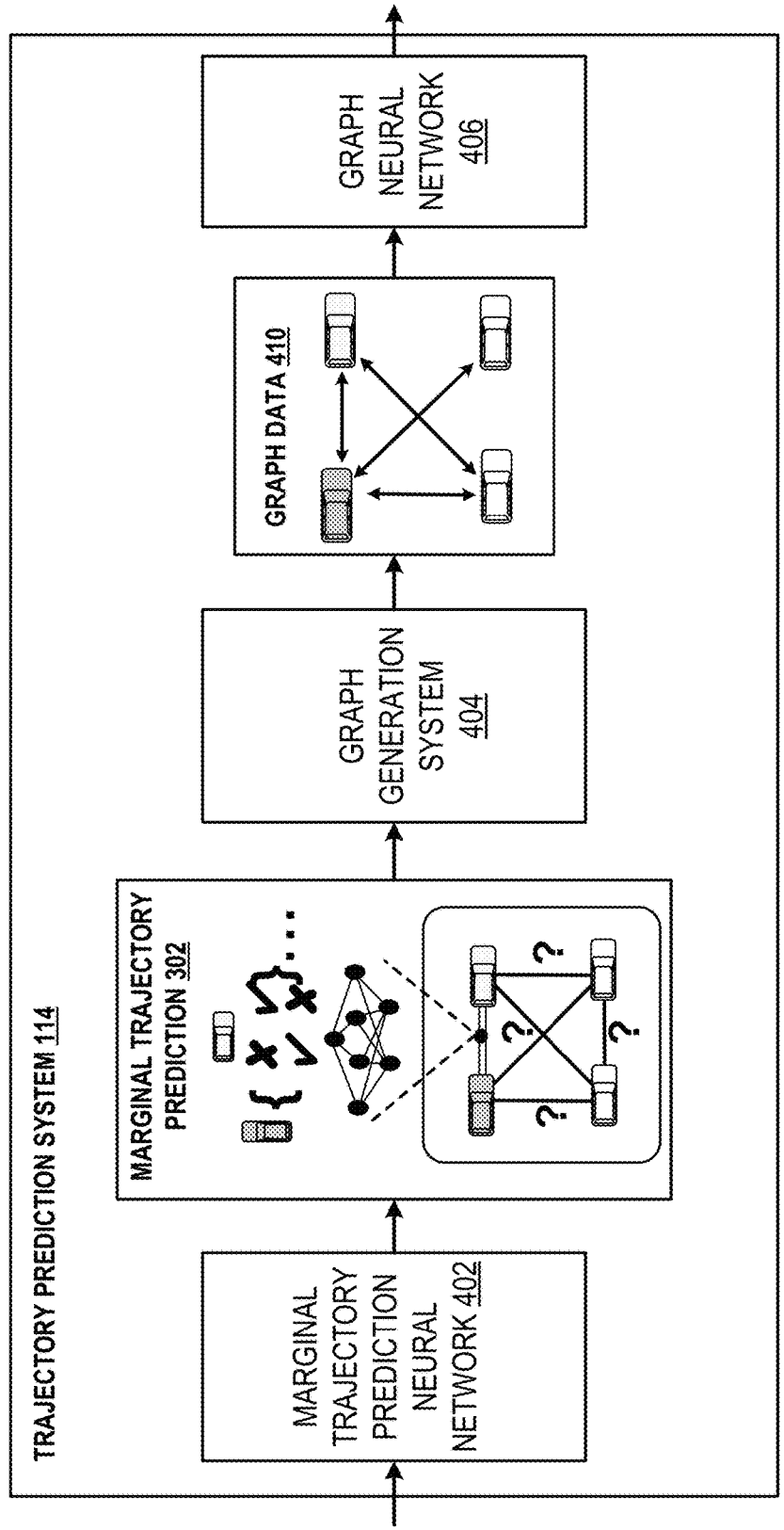
FIG. 4 is a block diagram of an example trajectory prediction system.

FIG. 4 shows a block diagram of an example trajectory prediction system. For convenience, the training trajectory prediction system 138 and the trajectory prediction system 114 will be described as being implemented by a system of one or more computers located in one or more locations, e.g., the on-board system 110 or the training system 122 of FIG. 1.

The trajectory prediction system 114 includes a marginal trajectory prediction neural network 402, a graph generation system 404, and a graph neural network 406.

The trajectory prediction system 114 uses the marginal trajectory prediction neural network 402 to process the scene context data in order to generate a respective marginal trajectory prediction 302 for each of the multiple agents. The marginal trajectory prediction 302 defines multiple possible future trajectories for each agent after the current time point and a respective likelihood score for each of the possible future trajectories.

As described above, certain marginal predictions may be inconsistent with one another, e.g., if a possible marginal trajectory of a first car can result in a collision with a possible marginal trajectory of a second car. These inconsistent marginal predictions are marked with an X in the Figure, whereas other marginal trajectories that are not likely to be inconsistent with one another are marked with a check.

To resolve potential inconsistencies and overlaps, the trajectory prediction system 114 then uses the graph generation system 404 to process the respective marginal trajectory predictions 302 in order to generate graph data 410. The graph data 410 represents a graph with a respective node for each of the agents and edges that each connect a respective pair of nodes (e.g., a pair of agents). In particular, the graph generation system 404 generates respective node features for multiple nodes of the graph and respective edge features for multiple edges of the graph based on the respective marginal trajectory predictions.

For each of the multiple pairs of agents, the graph generation system 404 determines whether to connect nodes representing the pair of agents with an edge based on the respective marginal trajectory predictions for the pair of agents.

For example, the graph generation system 404 identifies a respective highest-scoring possible future trajectory for each of the agents in the pair according to the likelihood scores in the respective marginal trajectory prediction for the agent. The graph generation system 404 then determines whether to connect nodes representing the pair of agents with an edge based on an similarity between the respective highest-scoring possible future trajectories, where the similarity is measured by overlaps or a different interactivity measure. For example, the system can determine to connect nodes representing the two edges if the two highest-scoring trajectories overlap at any given point during the trajectories. As another example, the system can determine to connect nodes representing the two edges if the two highest-scoring trajectories come within a threshold distance of one another at any given point during the trajectories.

In some examples, the graph data 410 includes a node representing a target agent and the graph is a star-graph that connects the node representing the target agent to all other nodes in the graph. For example, the graph can be centered on the target agent with connections to all other agents.

In some examples, the graph data 410 includes a node representing a conditioning agent and the future behavior prediction for the conditioning agent is fixed to a conditioning future trajectory for the conditioning agent. That is, the system uses, as the marginal trajectory prediction for the conditioning agent, the conditioning future trajectory for the agent and assigns a likelihood of one to the trajectory.

The graph generation system 404 then generates edge features and node features of the graph data 410 based on the interactions between agents using unary potentials and piecewise potentials of a potential prediction neural network, as described in further detail with reference to FIG. 5.

The trajectory prediction system 114 then uses the graph neural network 406 to process the graph data 410 in order to generate the joint trajectory prediction output. The joint trajectory prediction output identifies the most likely future trajectory for each agent given the marginal trajectory predictions 302 of the multiple agents. In particular, the graph neural network 406 applies a sum-product passing to obtain the approximated joint probability, i.e., that assigns a respective probability to each of one or more joint trajectories that include a respective trajectory for each agent, and a max-product passing to generate the joint trajectory prediction output, i.e., to identify the most likely trajectory for each agent given the marginal trajectory predictions for all agents.

In some examples, the trajectory prediction system 114 uses the graph neural network to generate the joint trajectory prediction output based on the conditioning agent. In this example, the graph neural network 406 can generate joint future trajectories for multiple agents conditioned on specific trajectory (e.g., the conditioning future trajectory) of the conditioning agent. For example, the conditioning agent can be an autonomous vehicle, e.g., the vehicle 102, and the conditioning trajectory can be a planned trajectory for the vehicle generated by the planning system.

Figure 5:
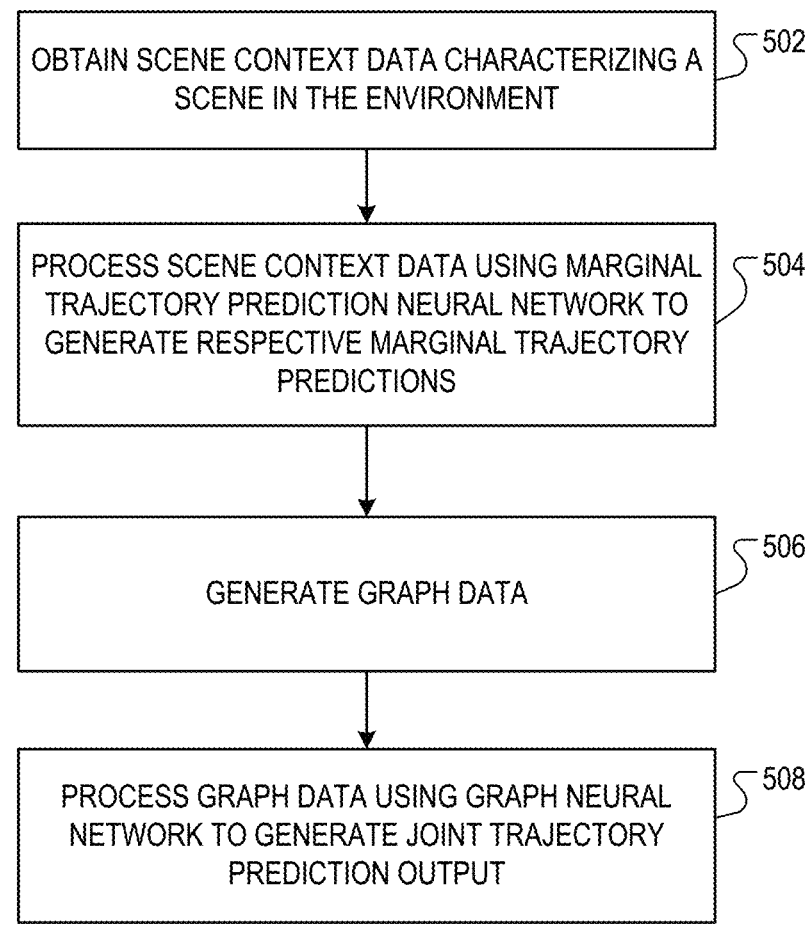
FIG. 5 is a flow diagram of an example process 500 for generating a joint trajectory prediction for multiple agents in an environment.

FIG. 5 is a flow diagram of an example process 500 for generating a joint trajectory prediction for multiple agents in an environment. For convenience, the process 500 will be described as being performed by a system of one or more computers located in one or more locations. For example, a system, e.g., the system 100 of FIG. 1, appropriately programmed in accordance with this specification, can perform the process 500.

The system obtains scene context data characterizing a scene in the environment (502). The scene context data characterizes the scene at a current time point, and the scene includes multiple agents in the vicinity of the autonomous vehicle in the environment.

The system processes the scene context data using a marginal trajectory prediction neural network to generate respective marginal trajectory predictions (504). The marginal trajectory prediction neural network can have any appropriate architecture that allows the marginal trajectory prediction neural network to generate marginal trajectory predictions for one or more agents, e.g., an architecture of a Scene Transformer model, a DenseTNT model, a Multipath++ model, etc. The system generates the respective marginal trajectory predictions for each agent of the multiple agents. The respective marginal trajectory prediction defines multiple possible future trajectories for the agent after the current time point and a respective likelihood score for each of the multiple possible future trajectories.

The system generates graph data representing a graph of the scene based on the marginal trajectory prediction (506). The graph data includes a respective node for each of the multiple agents and edges that each connect a respective pair of nodes.

In some implementations, the graph includes a node representing a target agent. In this example, the graph is a star-graph that connects the node representing the target agent to all other nodes in the graph. In some of these examples, the graph can include a node representing a conditioning agent and the future behavior prediction for the agent can be fixed to a conditioning future trajectory for the conditioning agent.

In some other implementations, the system dynamically generates the edges of the graph based on interactivity as described above.

The system generates the graph data representing a graph of the scene by generating respective node features for each of the multiple nodes and respective edge features for each of the multiple edges based on the respective marginal trajectory predictions.

The system models the graph data using a graph generation system. In particular, the system uses both unary features and pairwise features of the interactions between agents generated by a potential prediction neural network of the graph generation system. The unary features correspond to each agent of the multiple agents and are modeled as the features of the nodes of the graph data, and the pairwise features correspond to interactions between a pair of agents and are modeled as the features of the edges of the graph data.

In some examples, the system generates the respective node features for each of the multiple nodes by determining a unary potential feature for the node from the likelihood scores in the marginal trajectory prediction for the agent represented by the node.

In particular, the system uses the graph generation system to generate the respective node features and the respective edge features for multiple pairs of agents based on the unary and pairwise potentials of the agents, further defined by Equation 1:

$$E(s|X,\theta) = \Sigma_i E_{traj} + \Sigma_{(i,j) \in G} E_{pair}(s_i, s_j|X,\theta) \quad (1)$$

where $E_{traj}$ is a unary potential feature for each node, i is a first agent of the pair of agents, j is a second agent of the pair of agents, and $E_{pair}(s_i, s_j|X,\theta)$ is a pairwise potential feature for each agent pair (e.g., each edge).

The unary potential feature of each node is further defined by the negative log function of Equation 2:

$$E_{traj}(s_i|X,\theta) = -\log(q(s_i|X,\theta)) \quad (2)$$

where $q(s_i|X,\theta)$ is the likelihood score (e.g., the predicted probability) corresponding to each marginal trajectory prediction 302, where, for each of the multiple nodes of the graph, the graph generation system 404 determines the unary potential feature for the node from the likelihood scores in the marginal trajectory prediction for the agent represented by the node.

In some other examples, the system generates the respective node features for each of the multiple nodes by determining a pairwise potential feature for the edge from the marginal trajectory predictions for the pair of agents represented by the nodes connected by the edge.

In particular, the system can determine the pairwise potential feature for the edge by generating transformed trajectories for the first agent in the pair by transforming the predicted future trajectories in the marginal behavior prediction for the first agent into a coordinate system centered at the second agent in the pair.

In particular, the system can use the graph generation system to generate transformed trajectories for the second agent in the pair by transforming the predicted future trajectories in the marginal behavior prediction for the second agent into a coordinate system centered at the first agent in the pair, and the system can generate the pairwise potential feature from the transformed trajectories for the first agent and the transformed trajectories for the second agent. The system can generate the pairwise potential feature by processing each pair of transformed trajectories that includes a first agent trajectory and a second agent trajectory using a potential prediction neural network to generate a respective predicted potential score for the pair.

The pairwise potential feature of each edge is generated by the potential prediction neural network and is further defined by Equation 3:

$$E_{pair}(s_i, s_j | X, \theta) = \text{MLP}([\text{MLP}([s_{j@i}, s_i]), \text{MLP}([s_{i@j}, s_j])]) \quad (3)$$

where $s_{i@j}$ is a projection of the predicted trajectories $s_i$ of agent i into a centered coordinate system corresponding to agent j, $s_{j@i}$ is a projection of the predicted trajectories s 1 of agent j into a centered coordinate system corresponding to agent i. The pairwise potential features of each of the future trajectories K make up a K×K matrix. $[s_{i@j}, s_{j@i}]$ is a concatenation of the predicted trajectories, where each concatenation is input to an inner multilayer perceptron (MLP) model. The potential prediction neural network (e.g., the outer MLP model) processes the pairwise potential features to generate a predicted potential score for each pair of trajectories for each of the pairs of agents.

The system then processes the graph data using a graph neural network to generate the joint trajectory prediction output for the multiple agents (508). The joint trajectory prediction output identifies the most likely future trajectory for each agent given the marginal trajectory predictions for the multiple agents.

In some examples, the joint trajectory prediction output approximates a joint probability distribution over future trajectories for each agent of the multiple agents. In some examples, the joint probability distribution is a joint probability distribution over the possible future trajectories in the marginal trajectory predictions for the multiple agents.

In some examples, the joint trajectory prediction output is based on a conditioning agent. In particular, the system can generate the joint trajectory prediction output by using a modified unary potential based on the conditioning agent, such that the graph neural network 406 selects the conditioning future trajectory for each agent.

During training, the training trajectory prediction system 138 minimizes a negative joint log-likelihood function for all trajectories, as shown by Equation 5:

$$\min_\theta \sum_{s, X \in D} -\log p(s | X, \theta) \quad (5)$$

where s is the future trajectory of the multiple agents, X is the input data (e.g., the scene context data), and θ is the parameters of the function. The negative joint log-likelihood function represents the predicted probability (e.g., the likelihood score) corresponding to the future trajectories of the multiple agents.

The training trajectory prediction system 138 minimizes the overall loss function, as defined by Equation 6:

$$\mathcal{L} = \mathcal{L}_{reg} + \alpha \mathcal{L}_{E_{traj}} + \beta \mathcal{L}_{E_{pair}} \quad (6)$$

where $\mathcal{L}_{reg}$ is a Huber regression loss for making selected predicted trajectories closer to the ground truth trajectories, $\mathcal{L}_{E_{traj}}$ is a unary loss term, $\mathcal{L}_{E_{pair}}$ is a pairwise loss term, and α and β are hyperparameter weights.

Specifically, the unary loss term is computed using a stop gradient function and a cross entropy function, defined by Equation 7:

$$\mathcal{L}_{E_{traj}} = \text{cross\_entropy}(\mu_i + \text{stop\_gradient}(\hat{\mu}_i - \mu_i)) \quad (7)$$

where $\mu_i$ is the unary softmax log it for each trajectory of each agent.

Additionally, the pairwise loss term is also computed using a stop gradient function and a cross entropy function, defined by Equation 8:

$$\mathcal{L}_{E_{pair}} = \text{cross\_entropy}(v_{i,j} + \text{stop\_gradient}(\hat{v}_{i,j} - v_{i,j})) \quad (8)$$

where $v_{i,j}$ is the binary softmax log it for interactions between a pair of agents.

This specification uses the term "configured" in connection with systems and computer program components. For a system of one or more computers to be configured to perform particular operations or actions means that the system has installed on IT software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining scene context data characterizing a scene in an environment at a current time point, wherein the scene includes a plurality of agents;
processing the scene context data using a marginal trajectory prediction neural network to generate a respective marginal trajectory prediction for each of the plurality of agents that defines (i) a plurality of possible future trajectories for the agent after the current time point and (ii) a respective likelihood score for each of the plurality of possible future trajectories;
generating, based on the respective marginal trajectory predictions for the plurality of agents, graph data representing a graph of the scene that comprises a respective node for each of the plurality of agents and edges that each connect a respective pair of nodes, the generating comprising:
determining whether to connect nodes representing a pair of agents of the plurality of agents with an edge based on respective marginal trajectory predictions for the pair of agents;
processing the graph data using a graph neural network to generate a joint trajectory prediction output for the plurality of agents in the scene; and
providing at least one of (i) the joint trajectory prediction output or (ii) data derived from the joint trajectory prediction output to an on-board system of an autonomous vehicle for use in controlling the autonomous vehicle.

2. The method of claim 1, wherein:
the scene context data comprises data generated from data captured by one or more sensors of an autonomous vehicle, and
the agents are agents in a vicinity of the autonomous vehicle in the environment.

3. The method of claim 2, wherein the joint trajectory prediction output is generated on-board the autonomous vehicle.

4. The method of claim 1, wherein:
the context data comprises data generated from data that simulates data that would be captured by one or more sensors of an autonomous vehicle in the real-world environment, and
the target agent is a simulated agent in a vicinity of the simulated autonomous vehicle in the computer simulation.

5. The method of claim 4, further comprising:
providing (i) the joint trajectory prediction output, (ii) data derived from the joint trajectory prediction output, or (iii) both for use in controlling the simulated autonomous vehicle in the computer simulation.

6. The method of claim 1, wherein determining whether to connect nodes representing the pair of agents with an edge based on the respective marginal trajectory predictions for the pair of agents comprises:
identifying a respective highest-scoring possible future trajectory for each of the agents in the pair according to the likelihood scores in the respective marginal trajectory prediction for the agent; and
determining whether to connect nodes representing the pair of agents with an edge based on a similarity between the respective highest-scoring possible future trajectories.

7. The method of claim 1, wherein the graph also includes a node representing a conditioning agent and the future behavior prediction for the agent is fixed to a conditioning future trajectory for the conditioning agent.

8. The method of claim 7, wherein the conditioning agent is an autonomous vehicle.

9. The method of claim 1, wherein the graph also includes a node representing a target agent and the graph is a star-graph that connects the node representing the target agent to all other nodes in the graph.

10. The method of claim 9, wherein the target agent is an autonomous vehicle.

11. The method of claim 1, wherein generating, based on the respective marginal trajectory predictions, graph data representing a graph of the scene that comprises a respective node for each of the plurality of agents and edges that each connect a respective pair of nodes comprises:
generating, based on the respective marginal trajectory predictions, respective node features for each of the plurality of nodes and respective edge features for each of the plurality of edges.

12. The method of claim 11, wherein generating, based on the respective marginal trajectory predictions, respective node features for each of the plurality of nodes and respective edge features for each of the plurality of edges comprises:
for each of the plurality of nodes, determining a unary potential feature for the node from the likelihood scores in the marginal trajectory prediction for the agent represented by the node.

13. The method of claim 12, wherein generating, based on the respective marginal trajectory predictions, respective node features for each of the plurality of nodes and respective edge features for each of the plurality of edges comprises:
for each of the plurality of edges, determining a pairwise potential feature for the edge from the marginal trajectory predictions for the pair of agents represented by the nodes connected by the edge.

14. The method of claim 13, wherein determining a pairwise potential feature for the edge from the marginal trajectory predictions for the agents represented by the nodes connected by the edge comprises:
generating transformed trajectories for the first agent in the pair by transforming the predicted future trajectories in the marginal behavior prediction for the first agent into the a coordinate system centered at the second agent in the pair;
generating transformed trajectories for the second agent in the pair by transforming the predicted future trajectories in the marginal behavior prediction for the second agent into a coordinate system centered at the first agent in the pair; and generating the pairwise potential feature from the transformed trajectories for the first agent and the transformed trajectories for the second agent.

15. The method of claim 14, wherein generating the pairwise potential feature from the transformed trajectories for the first agent and the transformed trajectories for the second agent comprises:
processing each pair of transformed trajectories that includes a first agent trajectory and a second agent trajectory using a potential prediction neural network to generate a respective predicted potential score for the pair.

16. The method of claim 1, wherein the joint trajectory prediction output identifies a most likely future trajectory for each agent given the marginal trajectory predictions for the plurality of agents.

17. The method of claim 16, wherein the joint trajectory prediction output approximates a joint probability distribution over future trajectories for the plurality of agents.

18. The method of claim 17, wherein the joint probability distribution is a joint probability distribution over the possible future trajectories in the marginal trajectory predictions for the plurality of agents.

19. A system comprising:
one or more computers; and
one or more storage devices storing instructions that, when executed by the one or more computers, cause the one or more computers to perform operations comprising:
obtaining scene context data characterizing a scene in an environment at a current time point, wherein the scene includes a plurality of agents;
processing the scene context data using a marginal trajectory prediction neural network to generate a respective marginal trajectory prediction for each of the plurality of agents that defines (i) a plurality of possible future trajectories for the agent after the current time point and (ii) a respective likelihood score for each of the plurality of possible future trajectories;
generating, based on the respective marginal trajectory predictions for the plurality of agents, graph data representing a graph of the scene that comprises a respective node for each of the plurality of agents and edges that each connect a respective pair of nodes, the generating comprising:
determining whether to connect nodes representing the pair of agents of the plurality of agents with an edge based on the respective marginal trajectory predictions for the pair of agents;
processing the graph data using a graph neural network to generate a joint trajectory prediction output for the plurality of agents in the scene; and
providing at least one of (i) the joint trajectory prediction output or (ii) data derived from the joint trajectory prediction output to an on-board system of the autonomous vehicle for use in controlling the autonomous vehicle.

20. One or more computer-readable storage media storing instructions that when executed by one or more computers cause the one or more computers to perform operations comprising: obtaining scene context data characterizing a scene in an environment at a current time point, wherein the scene includes a plurality of agents;
processing the scene context data using a marginal trajectory prediction neural network to generate a respective marginal trajectory prediction for each of the plurality of agents that defines (i) a plurality of possible future trajectories for the agent after the current time point and (ii) a respective likelihood score for each of the plurality of possible future trajectories;
generating, based on the respective marginal trajectory predictions for the plurality of agents, graph data representing a graph of the scene that comprises a respective node for each of the plurality of agents and edges that each connect a respective pair of nodes, the generating comprising:
determining whether to connect nodes representing the pair of agents of the plurality of agents with an edge based on the respective marginal trajectory predictions for the pair of agents;
processing the graph data using a graph neural network to generate a joint trajectory prediction output for the plurality of agents in the scene; and
providing (i) the joint trajectory prediction output or (ii) data derived from the joint trajectory prediction output to an on-board system of the autonomous vehicle for use in controlling the autonomous vehicle.

* * * * *